US008813029B2

(12) United States Patent
Jin Eo et al.

(10) Patent No.: US 8,813,029 B2
(45) Date of Patent: *Aug. 19, 2014

(54) REMOTE CARD CONTENT MANAGEMENT USING SYNCHRONOUS SERVER-SIDE SCRIPTING

(75) Inventors: Young Jin Eo, Seoul (KR); Hyeongki Lee, Seongnam (KR); Jin Ho Lee, Seoul (KR); JooHo Lee, Seoul (KR)

(73) Assignee: International Business Machines Corporation, Armonk, NY (US)

( * ) Notice: Subject to any disclaimer, the term of this patent is extended or adjusted under 35 U.S.C. 154(b) by 157 days.

This patent is subject to a terminal disclaimer.

(21) Appl. No.: 13/479,348

(22) Filed: May 24, 2012

(65) Prior Publication Data

US 2013/0318508 A1    Nov. 28, 2013

(51) Int. Cl.
  *G06F 9/44*    (2006.01)
  *G06F 9/45*    (2006.01)

(52) U.S. Cl.
  USPC ............................ 717/115; 717/131; 717/139

(58) Field of Classification Search
  None
  See application file for complete search history.

(56) References Cited

U.S. PATENT DOCUMENTS

| | | | |
|---|---|---|---|
| 6,539,538 B1 * | 3/2003 | Brewster et al. | 717/115 |
| 7,162,631 B2 * | 1/2007 | Audebert et al. | 713/160 |
| 7,380,125 B2 * | 5/2008 | Di Luoffo et al. | 713/172 |
| 7,398,527 B2 * | 7/2008 | Hamdan et al. | 719/311 |
| 7,503,038 B2 * | 3/2009 | Pandit et al. | 717/139 |
| 7,668,864 B2 * | 2/2010 | Benson et al. | 717/115 |
| 7,823,133 B2 * | 10/2010 | Tamagno et al. | 717/131 |
| 7,886,148 B2 * | 2/2011 | Kiriansky et al. | 713/166 |
| 8,151,342 B2 * | 4/2012 | Choi et al. | 726/16 |
| 8,505,025 B2 * | 8/2013 | Nakamura | 717/115 |
| 2002/0169984 A1 * | 11/2002 | Kumar et al. | 713/201 |
| 2003/0177473 A1 * | 9/2003 | Banerjee et al. | 717/115 |
| 2006/0059462 A1 * | 3/2006 | Yamamoto | 717/115 |
| 2008/0081672 A1 * | 4/2008 | Miyamoto | 455/566 |

(Continued)

FOREIGN PATENT DOCUMENTS

| | | |
|---|---|---|
| GB | 2457221 | 8/2009 |
| WO | WO2010144120 | 12/2010 |

OTHER PUBLICATIONS

Esri Development Network, "Developing applications using the web ADF—ASP.NET Integration", 2014 resources.esri.com, pp. 1-7; <http://resources.esri.com/help/9.3/arcgisserver/adf/dotnet/developer/ADF/ajax_aspnet.htm>.*

(Continued)

*Primary Examiner* — Thuy Dao
*Assistant Examiner* — Ben C Wang
(74) *Attorney, Agent, or Firm* — Cantor Colburn LLP; Vazken Alexanian

(57) ABSTRACT

Remote card content management using synchronous server-side scripting is provided. A system includes a computer processor and a script interpreter executable by the computer processor. The script interpreter is configured to perform a method. The method includes parsing a script configured to perform a card content management operation as a sequence of operations for a secure element based on receiving a request from a mobile device located remotely from the computer processor. The method also includes creating an execution context for the script to identify the sequence of operations in the script as non-flushing and flushing nodes. A flushing node is identified as an operation that sends a response to the request and expects a subsequent request from the mobile device for the secure element. The method further includes pausing execution of the script upon sending the response at the flushing node.

20 Claims, 5 Drawing Sheets

(56) References Cited

U.S. PATENT DOCUMENTS

| | | | |
|---|---|---|---|
| 2008/0249938 A1* | 10/2008 | Drake-Stoker | 705/44 |
| 2009/0064301 A1* | 3/2009 | Sachdeva et al. | 726/9 |
| 2009/0098825 A1 | 4/2009 | Huomo et al. | |
| 2009/0113111 A1* | 4/2009 | Chen et al. | 711/6 |
| 2010/0011209 A1* | 1/2010 | Kiriansky et al. | 713/166 |
| 2010/0190437 A1 | 7/2010 | Buhot | |
| 2010/0211504 A1 | 8/2010 | Aabye et al. | |
| 2010/0274678 A1 | 10/2010 | Rolf et al. | |
| 2011/0010234 A1 | 1/2011 | Lindelsee et al. | |
| 2011/0154462 A1* | 6/2011 | Charbonnier et al. | 726/7 |
| 2011/0161938 A1* | 6/2011 | Marum et al. | 717/131 |
| 2013/0047077 A1* | 2/2013 | Vick et al. | 715/237 |
| 2013/0318508 A1* | 11/2013 | Jin Eo et al. | 717/139 |

OTHER PUBLICATIONS

Wright et al., "Survey of Existing Languages to Model Interactive Web Application", 2008 ACM, APCCM 2008, Wollongong, Australia, pp. 113-123; <http://dl.acm.org/results.cfm?h=1&cfid=429287952&cftoken=88477422>.*

Yu et al., "How to Choose Server-side Scripting Languages and Database Servers in Web", 2008 IEEE, pp. 98-102; <http://ieeexplore.ieee.org/stamp/stamp.jsp?tp=&arnumber=4732794>.*

Stranges, et al., A New SIM-Centric Solution for NFC Mobile Payment, Oberthur Techologies, 2008, 16 pages.

The Next Payment Evolution From Contractless to Mobile Payment, Smartcard Payment Association, Dec. 7, 2010, 19 pages.

The Role of SIM OTA and The Mobile Operator in the NFC Environment, Smart Trust, Apr. 2009, 12 pages.

J. Field, et al., "Reactors: A Data-Oriented Synchronous/Asynchronous Programming Model for Distributed Applications," Springer-Verlag Berlin Heidelberg 2007, pp. 76-95.

C. Craioveanu, "Server-Side Script Polymorphism: Techniques of Analysis and Defense," 2008 IEEE, pp. 9-16.

B. Bloom, et al., "Thorn Robust, Concurrent, Extensible Scripting onf the JVM," 2009 ACM, OOPSLA 2009, Oct. 25-29, 2009 Orlando, Florida, USA, pp. 117-136.

* cited by examiner

REMOTE CARD CONTENT MANAGEMENT USING SYNCHRONOUS SERVER-SIDE SCRIPTING

BACKGROUND

The present invention relates to remote card content management and, more specifically, to remote card content management of secure elements using synchronous server-side scripting.

The use of multi-application smart cards is becoming increasingly widespread and there are strong market initiatives to embed these secure elements into mobile devices. In the context of smart cards, an application protocol data unit (APDU) is the communication unit between a smart card and a smart card reader. Remote card content management controls delivery of card content management commands or APDUs to a secure element hosted in a mobile device. A common and flexible scripting language may be used for programmatically carrying out card content management. Once one or more card content management operations are programmed using the scripting language, as part of the script execution, APDUs are expected to be generated and sent to the secure element. Based on the response from the secure element, it is possible to use programming constructs such as if-else statements in the scripting language to implement error-handling logic or other decision-based logic. It is also possible to extend and customize the scripting language to meet more specific requirements.

A mobile environment is inherently asynchronous while the script methods that send APDUs to the secure element are expected to be synchronous. That is, if a method sends an APDU to the secure element, the invocation should block until the card response is received. This synchronous behavior enables programmatic capabilities of the scripting language to be utilized. A further challenge to remote card content management is that a script interpreter running on a server cannot initiate sending of APDUs to a mobile device when the mobile device always acts as a client. While text-based fragmentation may be used to split a script into multiple subscripts, programmatic capabilities of the script, such as flushing in combination with if-else clauses cannot be utilized with text-based fragmentation. A state-machine implementation may be used in systems supporting high-level language execution, but using such a high-level language removes the flexibility and portability that scripting provides.

SUMMARY

According to one embodiment of the present invention, a system for remote card content management using synchronous server-side scripting is provided. The system includes a computer processor and a script interpreter executable by the computer processor. The script interpreter is configured to perform a method. The method includes parsing a script configured to perform a card content management operation as a sequence of operations for a secure element based on receiving a request from a mobile device located remotely from the computer processor. The method also includes creating an execution context for the script to identify the sequence of operations in the script as non-flushing and flushing nodes. A flushing node is identified as an operation that sends a response to the request and expects a subsequent request from the mobile device for the secure element. The method further includes pausing execution of the script upon sending the response at the flushing node.

According to another embodiment of the present invention, a computer program product for remote card content management using synchronous server-side scripting is provided. The computer program product includes a non-transitory storage medium having computer-readable program code embodied thereon, which when executed by a computer processor, causes the computer processor to implement a method. The method includes parsing a script configured to perform a card content management operation as a sequence of operations for a secure element based on receiving a request from a mobile device located remotely from the computer processor. The method also includes creating an execution context for the script to identify the sequence of operations in the script as non-flushing and flushing nodes. A flushing node is identified as an operation that sends a response to the request and expects a subsequent request from the mobile device for the secure element. The method further includes pausing execution of the script upon sending the response at the flushing node.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Exemplary embodiments relate to remote card content management of secure elements (e.g., smart cards) using synchronous server-side scripting. In a non-remote scenario, such as establishing a network connection between a server and a printer, synchronous behavior may be managed using a transmission control protocol (TCP) socket connection that can stay open while waiting for a response. A script interpreter, which is a software module that executes a script, can initiate sending of application protocol data units (APDUs) to a secure element by invoking a daemon process running on the server. In a remote scenario however, the script interpreter cannot initiate sending of APDUs to a mobile device. Additionally, there may not be sufficient resources available to keep a TCP socket connection open while waiting for a response in the remote scenario, such as in a mobile environment. In embodiments, a script interpreter is provided which identifies flushing methods that send APDUs and receive responses in subsequent requests. The flushing methods are pause points encountered during script execution. An entire script execution context of each individual card content management operation may be saved either in memory or through persistence (e.g., written to non-volatile storage) whenever a flushing method is invoked. Script execution is resumed upon receiving a subsequent request from a mobile device for APDUs. Resuming script execution may be achieved by marking where the script interpreter paused each time a flushing method is invoked.

Figure 1:
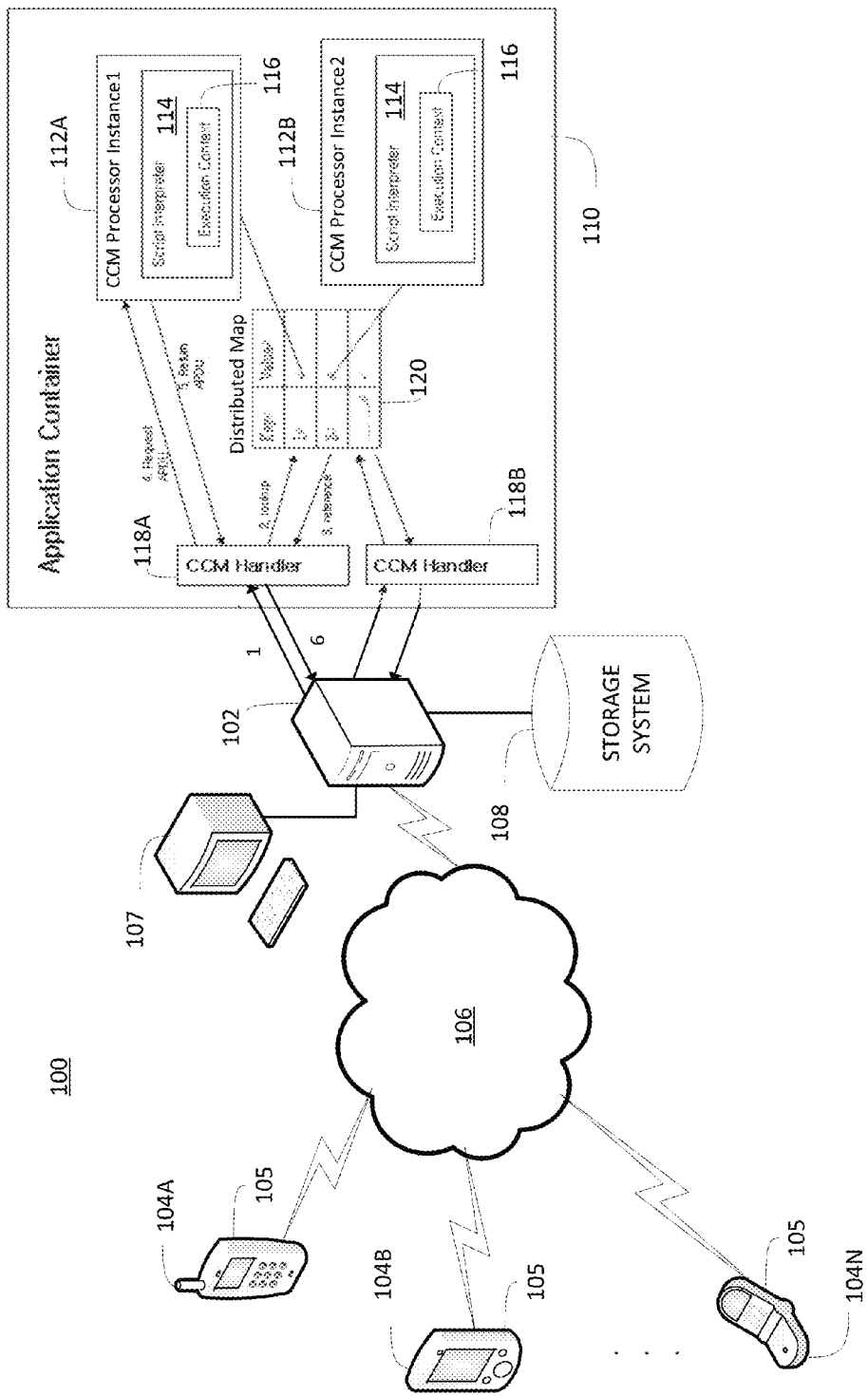
FIG. 1 depicts a block diagram of a system upon which remote card content management using synchronous server-side scripting may be implemented according to an embodiment of the present invention.

Turning now to FIG. 1, an example of a system 100 upon which remote card content management of secure elements using synchronous server-side scripting may be implemented will now be described in greater detail. The system 100 represents a mobile environment. In the example depicted in FIG. 1, the system 100 includes a server system 102 configured to communicate with one or more mobile devices 104A-N over a communication network 106. In exemplary embodiments, the server system 102 is a high-speed processing device (e.g., a mainframe computer, a desktop computer, a laptop computer, a hand-held device, an embedded computing device, or the like) including at least one processing circuit (e.g., a computer processor/CPU) capable of reading and executing instructions, and handling interactions with various components of the system 100.

In exemplary embodiments, the mobile devices 104A-N, each generally referred to as mobile device 104, can include a variety of mobile handsets and mobile computing devices with processing circuits and I/O interfaces, such as a keys/buttons, a touchscreen, audio input, a display device and audio output. In the example depicted in FIG. 1, the mobile devices 104A-N each includes a smart card 105, also referred to as a secure element 105. The server system 102 and mobile devices 104A-N can include various computer/communication hardware and software technology known in the art, such as one or more processing units or circuits, volatile and non-volatile memory including removable media, power supplies, network interfaces, support circuitry, operating systems, and the like. The server system 102 may also include one or more user interfaces 107 with user accessible I/O devices, such as a keyboard, mouse, and display.

The communication network 106 may be any type of communications network known in the art. The communication network 106 can include a combination of wireless, wired, and/or fiber optic links. The communication network 106 may support a variety of known communication standards that allow data to be transmitted wirelessly between the server system 102 and the mobile devices 104A-N, such as broadband wireless access. Additional computer systems (not depicted) may also access the server system 102 via the communication network 106 or other networks.

The system 100 also includes a data storage system 108. The data storage system 108 refers to any type of computer readable storage media and may comprise one or more secondary storage elements, e.g., hard disk drive (HDD), solid-state memory, tape, or a storage subsystem that is internal or external to the server system 102. Types of data that may be stored in the data storage system 108 include, for example, various files and databases. It will be understood that the data storage system 108 shown in FIG. 1 is provided for purposes of simplification and ease of explanation and is not to be construed as limiting in scope. To the contrary, there may be multiple data storage systems 108 utilized by the server system 102, which can be distributed in various locations of the system 100.

The server system 102 may execute application instances in application container 110, such as multiple card content management (CCM) processor instances. In the example depicted in FIG. 1, the application container 110 includes CCM processor instance 112A and CCM processor instance 112B. Each of the CCM processor instances 112A, 112B includes a script interpreter 114 and execution context 116. As the script interpreter 114 executes a script, context information, such as parameter values, script configuration and status, is locally managed as execution context 116 for each of the CCM processor instances 112A, 112B. CCM handlers 118A and 118B provide interfaces between the CCM processor instances 112A, 112B and processes external to the application container 110. In the example of FIG. 1, CCM handler 118A and CCM processor instance 112A are associated with a CCM operation for mobile device 104A, while CCM handler 118B and CCM processor instance 112B are associated with a CCM operation for mobile device 104B. Alternatively, the CCM handler 118A may be associated with multiple CCM operations and the CCM handler 118B can be omitted. A unique identifier is generated and assigned to each CCM operation. The CCM processor instances 112A, 112B may be created dynamically for each CCM operation. The CCM processor instances 112, 114 are stored in a map 120, also referred to as distributed map 120, along with keys corresponding to the unique identifiers. The map 120 may be stored in cache memory, main memory, or storage system 108, or be distributed between multiple memory elements that are accessible to server system 102. The CCM handlers 118A, 118B receive and process the requests from mobile devices 104A and 104B in the example of FIG. 1.

Continuing with the example of FIG. 1, mobile device 104A sends a hypertext transfer protocol (HTTP) POST request to send data as part of the request to the CCM handler 118A. The request may be part of an application installation or personalization request to update or configure the mobile device 104A. The data may include a unique identifier that maps to a key associated with a CCM operation in the map 120. The CCM handler 118A performs a lookup operation to identify a CCM processor instance associated with the key. In this example, the CCM handler 118A determines that the CCM operation for mobile device 104A is associated with CCM processor instance 112A. The CCM handler 118A retrieves CCM processor instance 112A and invokes methods on the CCM processor instance 112A to request and return one or more APDUs. The CCM handler 118A may send the returned one or more APDUs as an APDU response in an extensible markup language (XML) format. Smart card 105 at mobile device 104A includes logic configured to interpret commands in an APDU format. It will be understood that additional actions may also be performed, such as authentication and establishing a cryptographic key for secure communication.

Figure 2:
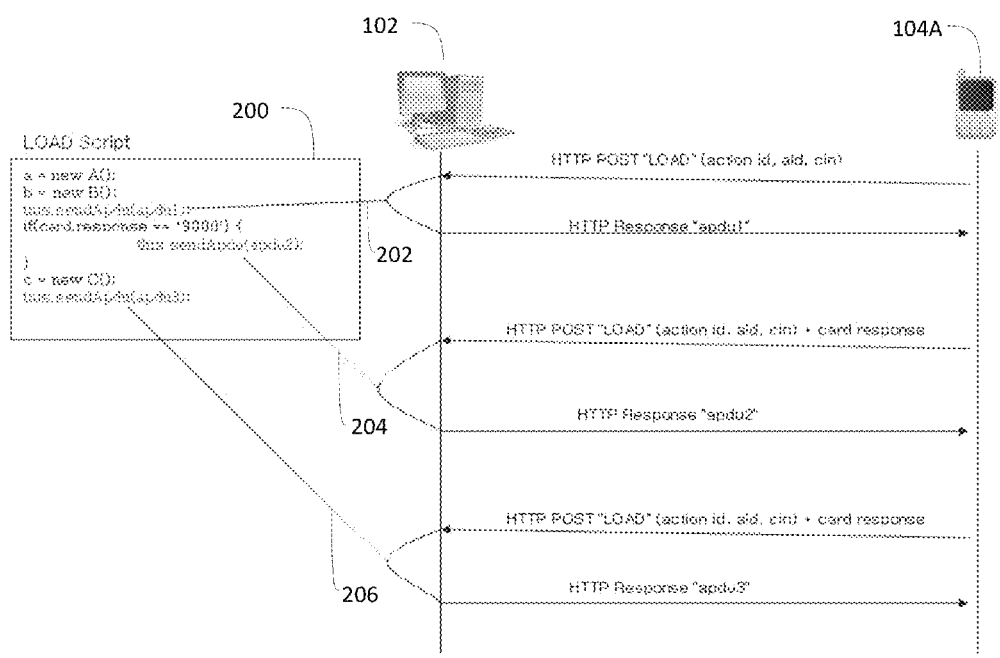
FIG. 2 depicts an example process flow for script execution according to an embodiment of the present invention.

FIG. 2 depicts an example process flow for script execution according to a further example. In FIG. 2, mobile device 104A sends an HTTP POST request for a LOAD script including parameters specifying an action identifier (action id), an application identifier (aid), and a card image number (cin). These parameters together identify a unique card content management operation for a particular cardholder. In response to the received request, a LOAD script 200 is processed by a script interpreter 114, for example, within CCM processor instance 112A of FIG. 1 as identified by CCM handler 118A based on the map 120 of FIG. 1. The execution of the LOAD script 200 proceeds up to a first occurrence of a flushing method 202, which in this example is "this.sendApdu(apdu1)". A flushing method is a method that sends an APDU to secure element 105 of FIG. 1. As can be seen in LOAD script 200, whether or not "apdu2" is sent to mobile device 104A in flushing method 204 is contingent on a card response from mobile device 104A to "apdu1". For LOAD script 200 to execute correctly, invocations of flushing method "sendApdu" must be synchronous. In embodiments, execution of a flushing method pauses script execution until a new request arrives from the same mobile device, i.e., mobile device 104A.

In the example of FIG. 2, after the server system 102 returns an APDU, as HTTP response "apdu1" in flushing method 202, the state of the execution context 116 of CCM processor instance 112A of FIG. 1 is saved in its entirety and execution of LOAD script 200 is paused. When the next HTTP POST request is received from mobile device 104A, execution of the LOAD script 200 resumes from where the execution context 116 was last saved. In this example, the HTTP response includes a card response which is checked as part of an if-else construct in LOAD script 200 to determine whether to execute flushing method 204. The flushing method 204 sends an HTTP response with "apdu2". Again, upon execution of flushing method 204, the state of the execution context 116 of CCM processor instance 112A of FIG. 1 is saved in its entirety and execution of LOAD script 200 is paused until a new request is received from the mobile device 104A. Upon receiving the next HTTP POST request from mobile device 104A, execution of the LOAD script 200 resumes from where the execution context 116 was last saved until flushing method 206 is executed to send "apdu3". The process continues until execution of LOAD script 200 is complete. Additional protocol features may include an initial request and response to determine a number of APDUs that the mobile device 104A should expect and a position identifier to indicate where in the process of sending multiple APDUs the server system 102 and the mobile device 104A are presently located.

Figure 3:
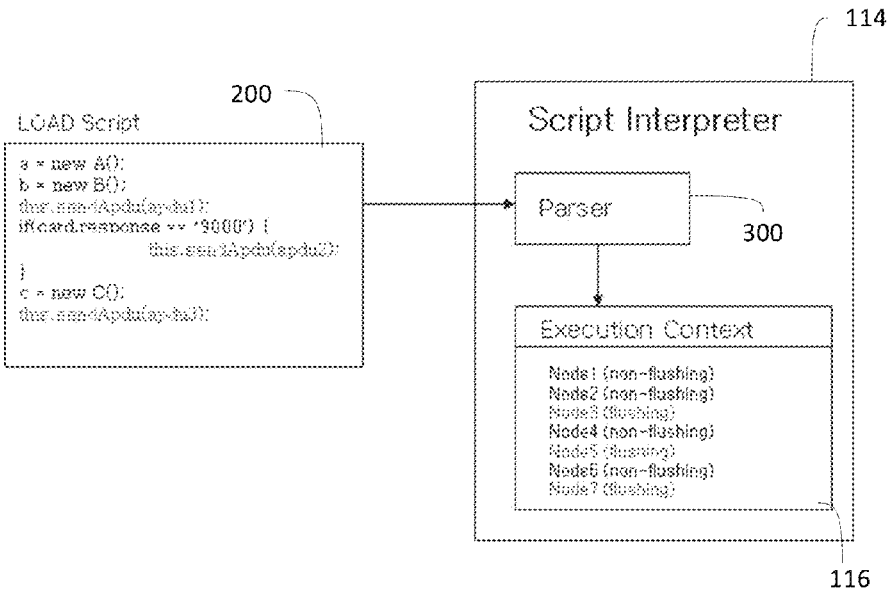
FIG. 3 depicts an example script interpreter according to an embodiment of the present invention.

FIG. 3 depicts an example of the script interpreter 114 of FIG. 1 in greater detail. The script interpreter 114 includes a parser 300 that converts a text representation of a script, such as LOAD script 200, into an interpretable list of nodes. The script interpreter 114 identifies flushing nodes versus non-flushing nodes. Nodes in the execution context 116 of FIG. 3 each map to a line in the LOAD script 200. For example, Node1 maps to line "a =new A();" in LOAD script 200, where Node1 is identified as a non-flushing node. Node2 maps to line "b =new B();" in LOAD script 200, which is also a non-flushing node. Node3 maps to line "this.sendApdu (apdu1);" in LOAD script 200, which as previously described is a flushing method and therefore is identified as a flushing node. When the script interpreter 114 encounters a flushing method while executing a script, it marks a corresponding flushing node in the execution context 116 as 'current', returns an APDU and pauses execution temporarily. When the script interpreter 114 resumes execution based on receiving a request from the same mobile device, mobile device 104A in this example, the script interpreter 114 resumes execution from the last current node.

Figure 4:
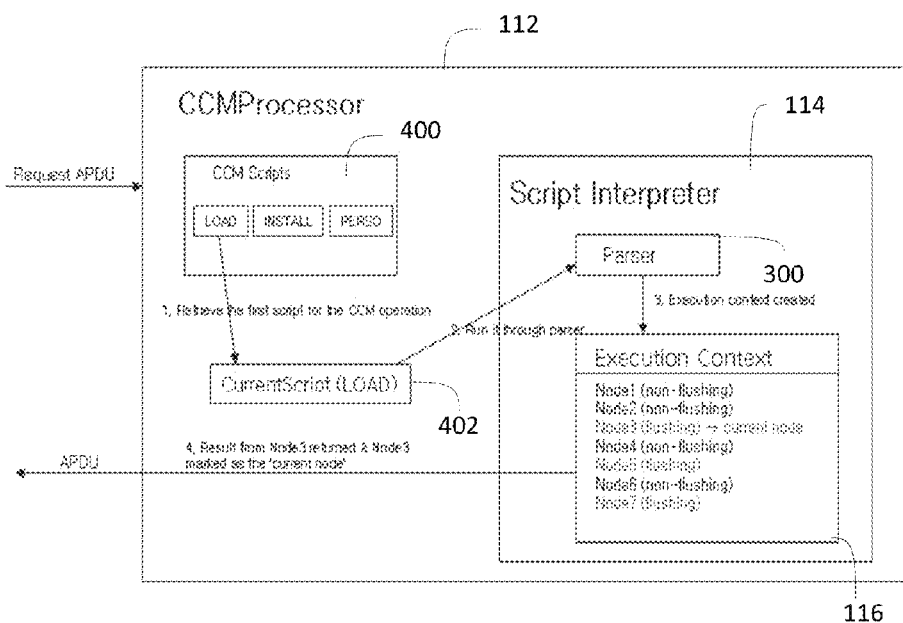
FIG. 4 depicts an example card content management processor according to an embodiment of the present invention.

FIG. 4 depicts an example of a CCM processor 112 in greater detail. The CCM processor 112 wraps the script interpreter 114 and makes calls to the script interpreter 114. Additionally, the CCM processor 112 keeps a list of scripts relevant for a given CCM operation in CCM scripts 400. For example, an application issuance operation may include a sequence of three separate scripts namely, LOAD, INSTALL and PERSO as shown in FIG. 4. The CCM processor 112 ensures that correct sequential execution of multiple scripts takes place. Upon receiving a request for an APDU as part of a CCM operation, the CCM processor 112 identifies and retrieves a current script from the CCM scripts 400 using a current script identifier 402, and invokes the script interpreter 114. The parser 300 creates execution context 116 to identify a sequence of flushing and non-flushing nodes. The script interpreter 114 executes until reaching a flushing node, which is Node3 in this example. A result from Node3 is returned which includes an APDU, and Node3 is marked as the current node. A complete instance of CCM processor 112 can be stored based on executing a flushing method and resumed based on receiving a new request associated with the same secure element 105 of a mobile device 104 associated with the instance of the CCM processor 112. Thus, current script and current node information may be restored when execution resumes to manage process flow between sequential scripts and flow within scripts.

Figure 5:
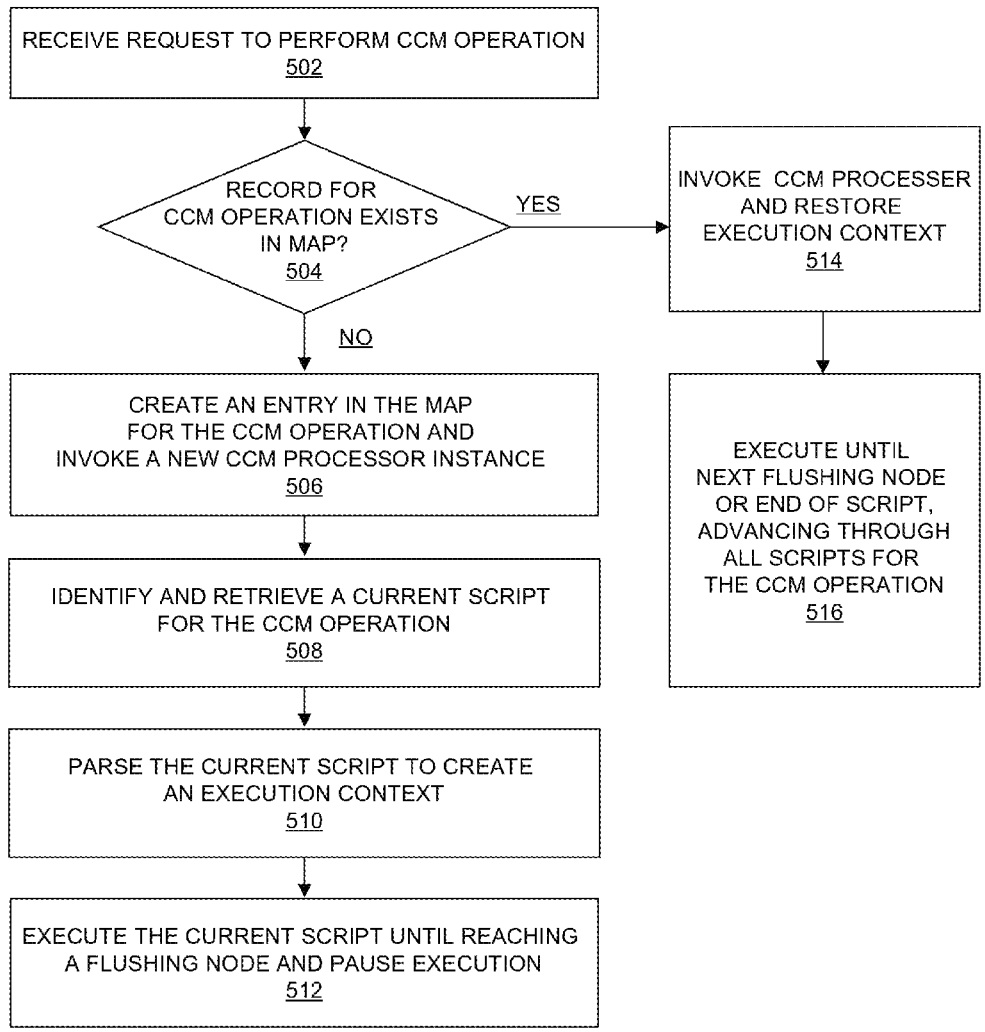
FIG. 5 depicts a flow diagram of a process for remote card content management using synchronous server-side scripting according to an embodiment of the present invention.

Turning now to FIG. 5, a process 500 for remote card content management using synchronous server-side scripting will be described in an exemplary embodiment. The process 500 is described in reference to FIGS. 1-4 and can be implemented by the server system 102 responsive to one or more of the mobile devices 104A-N of FIG. 1.

At block 502, the application container 110 receives a request to perform a CCM operation from a mobile device 104, such as mobile device 104A, over communication network 106. As depicted in FIG. 1, mobile devices 104A-N are located remotely from the server system 102. The server system 102 includes a computer processor configured to manage and execute the application container 110. The request may be received at CCM handler 118A which accesses map 120 based on a unique identifier associated with the CCM operation to determine whether an instance of the CCM processor 112, such as CCM processor instance 112A, is associated with the CCM operation for the secure element 105 at block 504. The map 120 may include unique identifiers associated with a plurality of CCM operations for a plurality of secure elements 105 and further associated with a plurality of CCM processor instances 112A, 112B, where each of the CCM processor instances 112A, 112B is a separate component in the application container 110. At block 506, if no instance of the CCM processor 112 is associated with the received CCM operation, a new instance of the CCM processor 112 can be invoked and entries in the map 120 may be created.

A plurality of CCM scripts may be associated with the received CCM operation. At block 508, the invoked instance of CCM processor 112 identifies and retrieves a current script for the received CCM operation using current script identifier 402. The current script is passed to the parser 300 of script interpreter 114. At block 510, the parser 300 of the script interpreter 114 parses the current script, such as LOAD script 200, to perform the received CCM operation as a sequence of operations for the secure element 105.

The parser 300 initially creates execution context 116 for the current script to identify the sequence of operations in the current script as non-flushing and flushing nodes. A flushing node is identified as an operation that sends a response to the request and expects a subsequent request from the mobile device 104 for the secure element 105. The request may be for an APDU for the secure element 105. Since the script interpreter 114 only sends an APDU in response to a request for an APDU and the script interpreter 114 does not initiate communication with the mobile device 104, any feedback from the mobile device 104 regarding the APDU sent by the script interpreter 114 is not received until the mobile device 104 sends a subsequent request.

At block 512, the current script executes and execution of the current script is paused upon sending the response at the flushing node. Pausing script execution may include marking the flushing node as a current node in the execution context 116, storing the execution context 116, and halting execution of the current script until a subsequent request is received from the mobile device 104.

Upon receiving the subsequent request, the instance of the CCM processor 112 associated with the CCM operation is identified in the map 120 at block 504, then the instance of the CCM processor 112 is invoked at block 514, which includes restoring previously saved execution context 116. The current script is identified and retrieved using the current script identifier 402 and the current node is identified in the execution context 116. At block 516, execution of the current script continues until a next flushing node is reached or the end of the current script is reached. Once all CCM scripts 400 for a CCM operation have completed, the CCM operation is complete. Records in the map 120 may be removed upon completion of a CCM operation. The map 120 may also be periodically monitored to clean stalled CCM operations that have timed out or remain incomplete for greater than a threshold time.

Figure 6:
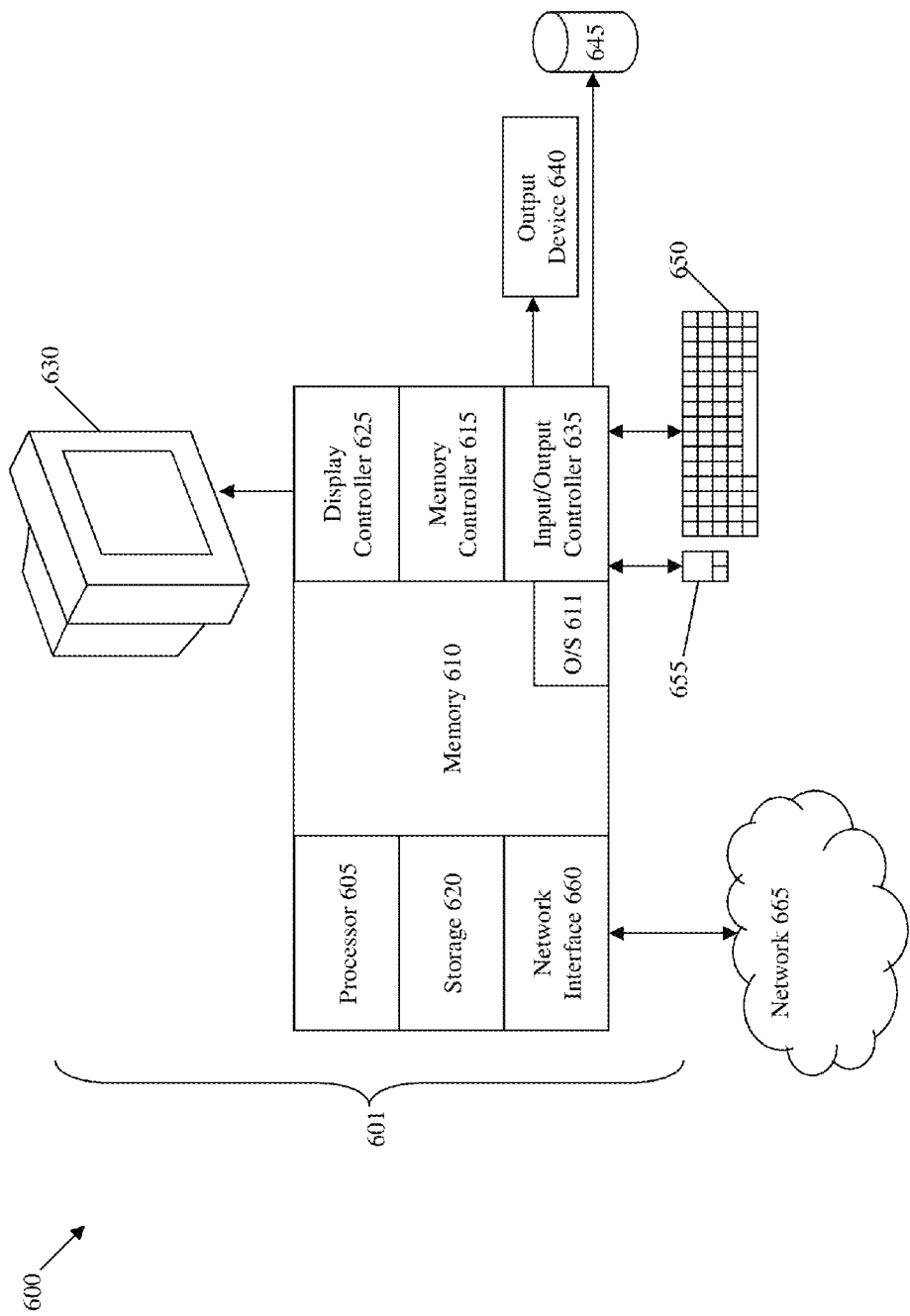
FIG. 6 depicts a further example of a block diagram of a system for remote card content management using synchronous server-side scripting.

FIG. 6 illustrates a block diagram of a system 600 for remote card content management using synchronous server-side scripting. The processes as previously described can be implemented in system 600 in hardware, software (e.g., firmware), or a combination thereof as part of a special or general-purpose digital computer, such as a personal computer, workstation, minicomputer, or mainframe computer. The system 600 therefore includes general-purpose computer 601 as illustrated in FIG. 6. The system 600 is a further example of the system 100 of FIG. 1, where the general-purpose computer 601 is an embodiment of the server system 102 of FIG. 1.

In an exemplary embodiment, in terms of hardware architecture, as shown in FIG. 6, the computer 601 includes a computer processor 605 and memory 610 coupled to a memory controller 615, and one or more input and/or output (I/O) devices 640, 645 (or peripherals) that are communicatively coupled via a local input/output controller 635. The input/output controller 635 can be, for example but not limited to, one or more buses or other wired or wireless connections, as is known in the art. The input/output controller 635 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The computer processor 605 is a hardware device for executing software, particularly software stored in storage 620, such as cache storage, or memory 610. The computer processor 605 can be any custom made or commercially available computer processor, a central processing unit (CPU), an auxiliary processor among several processors associated with the computer 601, a semiconductor based microprocessor (in the form of a microchip or chip set), a macroprocessor, or generally any device for executing instructions.

The memory 610 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 610 may incorporate electronic, magnetic, optical, and/or other types of storage media. Note that the memory 610 can have a distributed architecture, where various components are situated remote from one another, but can be accessed by the computer processor 605.

The instructions in memory 610 may include one or more separate programs, each of which comprises an ordered listing of executable instructions for implementing logical functions. In the example of FIG. 6, the instructions in the memory 610 include a suitable operating system (OS) 611. The operating system 611 essentially controls the execution of other computer programs and provides scheduling, input-output control, file and data management, memory management, and communication control and related services.

In an exemplary embodiment, a conventional keyboard 650 and mouse 655 can be coupled to the input/output controller 635. Other output devices such as the I/O devices 640, 645 may include input devices, for example but not limited to a printer, a scanner, microphone, and the like. Finally, the I/O devices 640, 645 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 600 can further include a display controller 625 coupled to a display 630. In an exemplary embodiment, the system 600 can further include a network interface 660 for coupling to a network 665. The network 665 can be an IP-based network for communication between the computer 601 and any external server, client and the like via a broadband connection. The network 665 transmits and receives data between the computer 601 and external systems. In an exemplary embodiment, network 665 can be a managed IP network administered by a service provider. The network 665 may be implemented in a wireless fashion, e.g., using wireless protocols and technologies, such as WiFi, WiMax, etc. The network 665 can also be a packet-switched network such as a local area network, wide area network, metropolitan area network, Internet network, or other similar type of network environment. The network 665 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 601 is a PC, workstation, intelligent device or the like, the instructions in the memory 610 may further include a basic input output system (BIOS) (omitted for simplicity). The BIOS is a set of essential software routines that initialize and test hardware at startup, start the OS 611, and support the transfer of data among the hardware devices. The BIOS is stored in ROM so that the BIOS can be executed when the computer 601 is activated.

When the computer 601 is in operation, the computer processor 605 is configured to execute instructions stored within the memory 610, to communicate data to and from the memory 610, and to generally control operations of the computer 601 pursuant to the instructions.

Technical effects include remote card content management of secure elements (smart cards) using synchronous server-side scripting. A script interpreter is provided which identifies flushing methods that send APDUs and receive card responses. An entire script execution context of each individual card content management operation may be saved either in memory or through persistence whenever a flushing method is invoked. Script execution is resumed upon receiving subsequent requests from a mobile device for APDUs. Resuming script execution may be achieved by marking where the script interpreter paused each time a flushing method is invoked. Thus, an otherwise asynchronous communication process is effectively performed synchronously.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible and non-transitory storage medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed:

1. A system, comprising:
   a computer processor; and
   a script interpreter executable by the computer processor, the script interpreter configured to perform a method comprising:
      parsing a script configured to perform a card content management operation as a sequence of operations for a secure element based on receiving a request from a mobile device located remotely from the computer processor, the mobile device including the secure element;
      creating an execution context for the script to identify the sequence of operations in the script as non-flushing and flushing nodes, a flushing node identified as an operation that sends a response to the request and expects a subsequent request from the mobile device for the secure element; and
      pausing execution of the script upon sending the response at the flushing node to establish synchronous server-side scripting for remote card content management of the secure element.

2. The system of claim 1, wherein pausing execution of the script further comprises:
   marking the flushing node as a current node in the execution context;
   storing the execution context; and
   halting execution of the script until the subsequent request is received.

3. The system of claim 2, wherein the script interpreter is further configured to perform:
   upon receiving the subsequent request, identifying the current node in the execution context; and
   continuing execution of the script until a next flushing node is reached.

4. The system of claim 1, further comprising:
   a card content management processor comprising: the script interpreter, a plurality of card content management scripts associated with the card content management operation, and a current script identifier.

5. The system of claim 4, further comprising:
   an application container comprising an instance of the card content management processor and a card content management handler, the card content management handler configured to invoke the instance of the card content management processor.

6. The system of claim 5, further comprising:
   a map configured to identify a unique identifier associated with the card content management operation and the instance of the card content management processor associated with the card content management operation for the secure element.

7. The system of claim 6, further comprising:
   a plurality of instances of the card content management processor associated with a plurality of card content management operations for a plurality of secure elements located remotely from the computer processor, wherein each of the instances of the card content management processor has a separate entry in the map and each of the instances of the card content management processor is a separate component in the application container.

8. The system of claim 1, wherein the secure element is a smart card in the mobile device.

9. The system of claim 8, wherein the request is for an application protocol data unit for the smart card, and further comprising:
   based on receiving the request, responding with the application protocol data unit at the flushing node.

10. The system of claim 9 wherein the script interpreter only sends the application protocol data unit in response to the request for the application protocol data unit.

11. A computer program product comprising a non-transitory storage medium having computer-readable program code embodied thereon, which when executed by a computer processor of a server system, causes the computer processor to implement a method, the method comprising:
    parsing a script configured to perform a card content management operation as a sequence of operations for a secure element based on receiving a request from a mobile device located remotely from the computer processor, the mobile device including the secure element;
    creating an execution context for the script to identify the sequence of operations in the script as non-flushing and flushing nodes, a flushing node identified as an operation that sends a response to the request and expects a subsequent request from the mobile device for the secure element; and
    pausing execution of the script upon sending the response at the flushing node to establish synchronous server-side scripting for remote card content management of the secure element.

12. The computer program product of claim 11, wherein pausing execution of the script further comprises:
    marking the flushing node as a current node in the execution context;
    storing the execution context; and
    halting execution of the script until the subsequent request is received.

13. The computer program product of claim 11, further comprising:

upon receiving the subsequent request, identifying the current node in the execution context; and continuing execution of the script until a next flushing node is reached.

14. The computer program product of claim 11, further comprising:

associating a plurality of card content management scripts with the card content management operation; and identifying and retrieving a current script using a current script identifier.

15. The computer program product of claim 14, further comprising:

invoking an instance of a card content management processor associated with the card content management operation in an application container, the card content management processor comprising: a script interpreter, the plurality of card content management scripts associated with the card content management operation, and the current script identifier.

16. The computer program product of claim 15, further comprising:

accessing a map based on a unique identifier associated with the card content management operation to determine which instance of the card content management processor is associated with the card content management operation for the secure element.

17. The computer program product of claim 16, wherein a plurality of instances of the card content management processor is associated with a plurality of card content management operations for a plurality of secure elements located remotely from the computer processor, and each of the instances of the card content management processor has a separate entry in the map and each of the instances of the card content management processor is a separate component in the application container.

18. The computer program product of claim 11, wherein the secure element is a smart card in the mobile device.

19. The computer program product of claim 18, wherein the request is for an application protocol data unit for the smart card, and further comprising:

based on receiving the request, responding with the application protocol data unit at the flushing node.

20. The computer program product of claim 19, further comprising:

only sending the application protocol data unit in response to the request for the application protocol data unit.

* * * * *